US 9,679,493 B2

(12) United States Patent
Tsui

(10) Patent No.: US 9,679,493 B2
(45) Date of Patent: Jun. 13, 2017

(54) DRAWING TOY WITH STYLUS DETECTION

(71) Applicant: VTech Electronics, Ltd., Hong Kong (CN)

(72) Inventor: Anthony M. F. Tsui, Hong Kong (CN)

(73) Assignee: VTECH ELECTRONICS, LTD., Hong Kong (HK)

(*) Notice: Subject to any disclaimer, the term of this patent is extended or adjusted under 35 U.S.C. 154(b) by 0 days.

(21) Appl. No.: 14/743,695

(22) Filed: Jun. 18, 2015

(65) Prior Publication Data

US 2015/0287334 A1   Oct. 8, 2015

Related U.S. Application Data

(63) Continuation of application No. 13/544,399, filed on Jul. 9, 2012, now abandoned.

(51) Int. Cl.
G09B 5/06       (2006.01)
G09B 11/00      (2006.01)
G09B 5/02       (2006.01)
G09B 19/00      (2006.01)

(52) U.S. Cl.
CPC ........... G09B 11/00 (2013.01); G09B 5/02 (2013.01); G09B 5/06 (2013.01); G09B 19/00 (2013.01)

(58) Field of Classification Search
CPC .......... G09B 11/00; G09B 19/00; G09B 5/06
USPC ........................................................ 434/87
See application file for complete search history.

(56) References Cited

U.S. PATENT DOCUMENTS

| 4,143,472 | A | 3/1979 | Murata et al. |
| 5,686,705 | A | 11/1997 | Conroy et al. |
| 5,877,458 | A | 3/1999 | Flowers |
| 6,585,554 | B1 * | 7/2003 | Hewitt ................ G10H 1/0008 434/408 |
| 7,621,441 | B1 | 11/2009 | Milford et al. |
| 7,916,124 | B1 | 3/2011 | Wood et al. |
| 2001/0051329 | A1 * | 12/2001 | Lynch .................. G06F 3/0224 434/317 |
| 2002/0197587 | A1 * | 12/2002 | Wood ...................... G09B 1/00 434/159 |
| 2003/0067427 | A1 | 4/2003 | Comiskey et al. |
| 2003/0104343 | A1 * | 6/2003 | Rehkemper ............ G09B 11/06 434/85 |

(Continued)

OTHER PUBLICATIONS

European Search Report dated Dec. 3, 2012 for European Application No. EP12177398.

Primary Examiner — Robert J Utama
Assistant Examiner — Robert P Bullington
(74) Attorney, Agent, or Firm — McAndrews, Held & Malloy, Ltd.

(57) ABSTRACT

A drawing toy and associated methods and computer-readable storage devices are disclosed. The drawing toy may comprise a stylus having a tip, a drawing surface configured to produce a visual path that follows a path of the tip along the drawing surface, and a plurality of stencils, each stencil comprising a plurality of designated areas and a plurality of trace paths. A controller of the drawing toy may identify a stencil placed upon the drawing surface, determine that a particular designated area of the placed stencil is proximate the stylus tip, and generate an output signal configured to cause a user perceivable output associated with the particular designated area determined to be proximate the stylus tip.

10 Claims, 6 Drawing Sheets

(56) References Cited

U.S. PATENT DOCUMENTS

| | | | |
|---|---|---|---|
| 2004/0043371 A1* | 3/2004 | Ernst | G09B 5/06 |
| | | | 434/317 |
| 2005/0106538 A1* | 5/2005 | Freeman | G09B 5/02 |
| | | | 434/167 |
| 2006/0202949 A1 | 9/2006 | Danner et al. | |
| 2007/0063986 A1 | 3/2007 | Hoga et al. | |
| 2008/0211764 A1 | 9/2008 | Albert et al. | |
| 2008/0280270 A1 | 11/2008 | Olsen et al. | |
| 2009/0113091 A1 | 4/2009 | Miller et al. | |
| 2011/0304577 A1* | 12/2011 | Brown | G06F 3/03545 |
| | | | 345/174 |
| 2012/0154340 A1* | 6/2012 | Vuppu | G06F 3/044 |
| | | | 345/179 |

\* cited by examiner

DRAWING TOY WITH STYLUS DETECTION

FIELD OF THE INVENTION

The present invention relates to a toy and, more particularly, to a drawing toy having a drawing surface and a stylus.

BACKGROUND OF INVENTION

Magnetic doodle, drawing toys are popular drawing toys because such drawing toys are clean, easily erasable, and inexpensive. With a magnetic stylus, a child may draw or write on the drawing surface leaving no mess of crayons, markers, paints, etc. A child may also easily erase the drawing surface by sliding the magnetic eraser and begin another drawing or writing over and over. An example of such a magnetic doodle is described in U.S. Pat. No. 4,143,472, entitled "Displaying Magnetic Panel And Its Displaying Device."

Another example of a magnetic doodle, drawing toy includes one or more stencils. The stencils serve as guides to assist a child, particularly a young child whose drawing or handwriting skills are yet to be developed. The stencils may contain a rich variety of objects, from simple dots, lines and curves, to shapes such as circles and hearts, to figures such as cartoon characters, animals or flowers, to language or mathematics symbols such as letters and numbers, etc. A child may produce their drawings and handwriting on the drawing surface by tracing along trace paths, such as indentations or cutouts, of a stencil that is laid upon the drawing surface.

However, such a magnetic doodle, drawing toy provides limited educational value and may have limited success in retaining a child's interest since such a toy is unable to provide the child with feedback about the objects on the stencils. In particular, a child may lose interest in drawing with such stencils if they do not understand what is depicted on such stencils.

Another magnetic doodle, drawing toy addresses some aspects of the above problem. In particular, such a drawing toy includes a stencil set, wherein each stencil in the set has identification tabs. Control electronics of the drawing toy may identify the stencil laid upon the drawing board based upon the identification tab of the stencil. The control electronics may then tell the child about the objects on the stencil based on data stored in its memory. For example, when a stencil of a monkey's face is used, the control electronics reads the identification tab and realizes that the stencil depicts a monkey's face. The control electronics may then provide the child with audible feedback about the depicted object. For example, the control electronics may generate an audible signal that states, "This is a monkey."

Although such a drawing toy may provide more educational value and achieve more success in retaining the child's interest, such a drawing toy is still limited due to the toys lack of ability to interact with the child while the child is tracing along the trace paths of a stencil.

SUMMARY OF INVENTION

Aspects of the present invention are directed to methods, systems, and apparatus, substantially as shown in and/or described in connection with at least one of the figures and as set forth more completely in the claims.

These and other advantages, aspects and novel features of the present invention, as well as details of illustrative aspects thereof, will be more fully understood from the following description and drawings.

DETAILED DESCRIPTION

Figure 1:
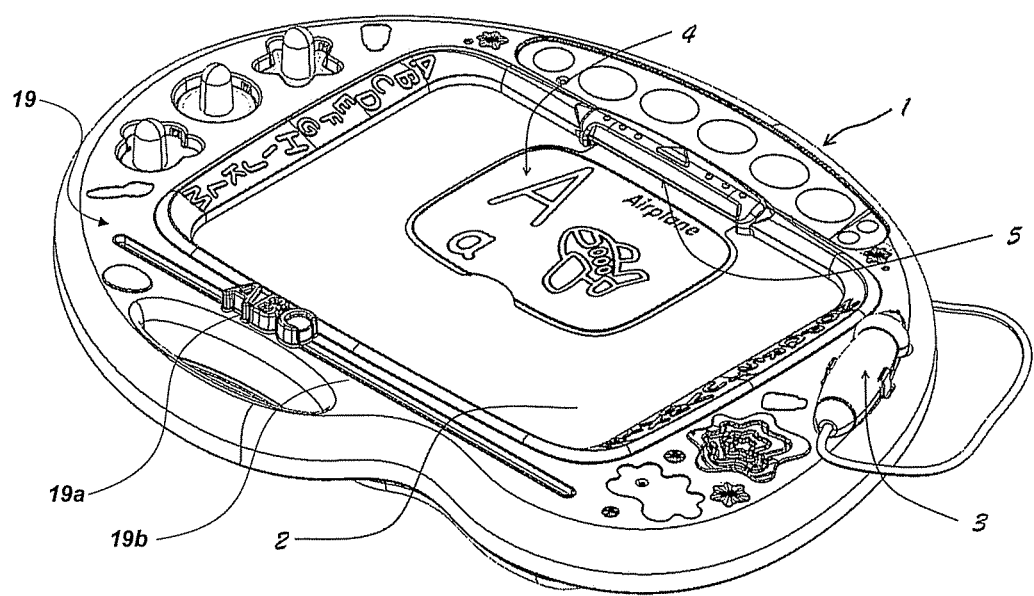
FIG. 1 illustrates a magnetic doodle, drawing toy which may incorporate various aspect of the present invention.

Various embodiments of a magnetic doodle, drawing toy are described herein by way of example and not by way of limitation in the accompanying figures. For clarity of illustration, exemplary elements illustrated in the figures may not necessarily be drawn to scale. In this regard, for example, the dimensions of some of the elements may be exaggerated relative to other elements. Furthermore, where considered appropriate, reference labels have been repeated among the figures to indicate corresponding or analogous elements.

Moreover, certain embodiments may be implemented as a plurality of instructions on a tangible, computer readable storage device such as, for example, flash memory devices, hard disk devices, compact disc media, DVD media, EEPROMs, etc. Such instruction when executed by a magnetic doodle, drawing toy or another computing device, may result in appropriate feedback in response to a child placing a stylus proximate to various areas of a drawing surface and/or stencil upon such drawing surface.

One advantageous aspect of some embodiments of the disclosed drawing toy over magnetic doodle, drawing toys mentioned above is that some embodiment may detect a location of a stylus on a drawing surface of the toy. Based on this detected location, a variety of interactive drawing games and activities may be created to hold a child's interest in playing with the drawing toy and thereby improve a child's eye-hand coordination, drawing skills, handwriting skills, and/or language skills.

Another advantageous aspect of some embodiments of the disclosed interactive drawing toy is that detection of a stylus location may be achieved inexpensively. In particular, some embodiments may achieve such detection without using a transparent touch-sensitive panel or a pressure-sensitive panel, which are typically more expensive to implement than the disclosed conductive layer sensor described below. As a result, some embodiments provide an interactive drawing toy which is simple and economical to manufacture.

Referring to the drawings, and more particularly to FIG. 1, a perspective view of a magnetic doodle, drawing toy is shown. As shown in FIG. 1, the drawing toy may include a base unit 1, a magnetic drawing panel 2, a magnetic stylus 3, a plurality or set of stencil cards 4 (only one of the set is shown in FIG. 1), a stencil reader 5, and an eraser 19. The drawing panel 2, stylus 3, and eraser 19 may cooperate to providing a clean, safe, and reusable drawing toy.

To this end, the drawing panel 2 may be implemented in a manner similar to that described in U.S. Pat. No. 4,143, 472. In particular, the drawing panel 2 may be formed using a viscous dispersing fluid contained between two transparent or translucent sheets and compartmentalized in a hexagonal grid. Such a formed hexagonal grid may be loaded with color-contrasting magnetic particles. A child may then apply a magnetic tip of the stylus 3 to an upper surface of the drawing panel 2 to pull the magnetic particles toward the upper surface and create a visual indication. The eraser 19 may include a handle 19a and track 19b as shown in FIG. 1 and a magnetic bar that traverses across the lower surface of the drawing panel 2. By sliding the handle 19a along the track 19b, the magnetic bar of the eraser passes across the entire lower surface of the drawing panel 2 and pulls the magnetic particles uniformly toward the lower surface and away from the upper surface. As a result of pulling the magnetic particles away from the upper surface, the eraser 19 removes the visual indication from the upper surface of the drawing panel 2 and thus erases the drawing panel 2.

Figure 2:
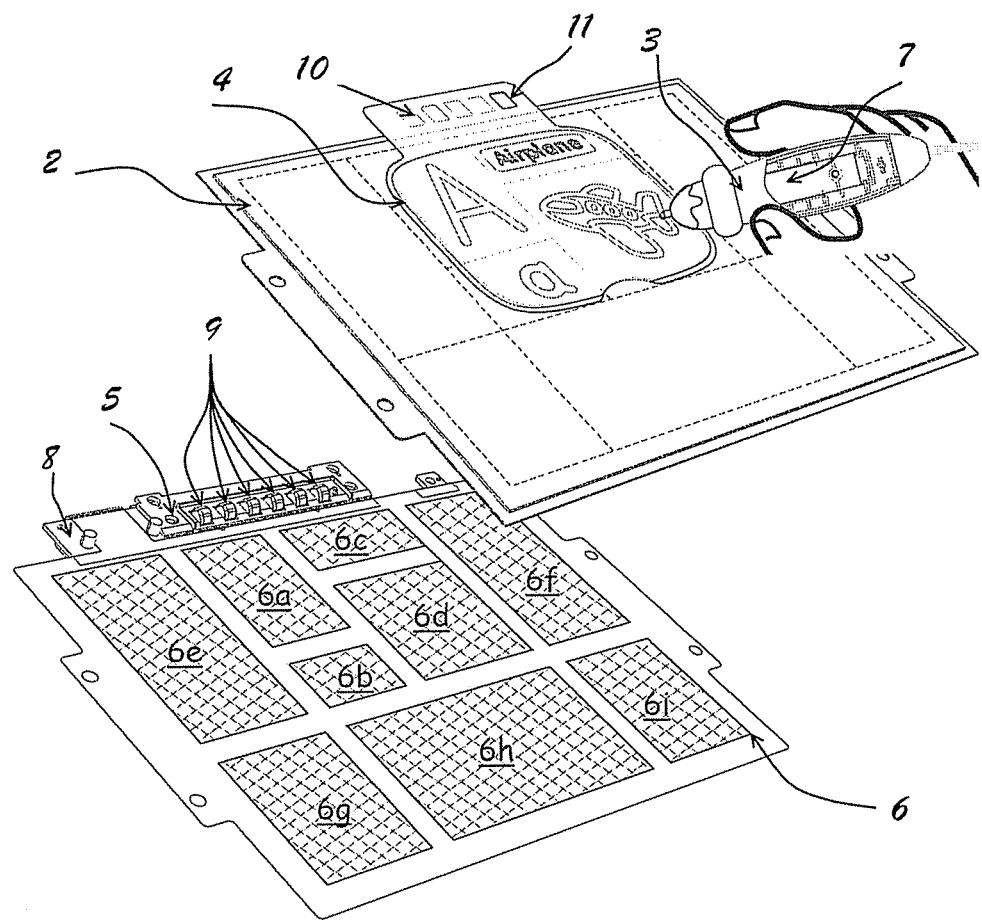
FIG. 2 illustrates further details of a stencil detector, a stylus locator, and other aspects of the drawing toy depicted in FIG. 1.

As shown in FIG. 2, a plurality of conductive pads 6 may be placed under the drawing panel 2. In particular, the plurality of conductive pads 6 are arranged in shapes and locations that correspond to designated areas of the stencils 4. In one embodiment, the plurality of conductive pads 6 are formed as a printed circuit of conductive ink on a non-conductive membrane underlay. However, it should be appreciated that the conductive pads 6 may be formed using other techniques.

Each conductive pad 6a-6i may be electrically connected to an individual input/output pin of a controller 8. In operation, the controller 8 may energize the conductive pads 6a-6i one at a time as part of a sensing procedure. In particular, the controller 8 may energize or activate the conductive pads 6a-6i one at a time in a sequential, random, or some other suitable pattern. As a result of energizing the conductive pads 6a-6i one at a time, each conductive pad 6a-6i emits an electromagnetic signal during an its activation period that is associated with a predefined region of the magnetic drawing panel 2. Due to such electromagnetic signals, the stylus 3 generates a control signal based upon its proximity to an energized conductive pad 6a-6i and its associated predefined area of the drawing panel 2.

For example, if the stylus 3 is tracing a picture of an airplane as shown in FIG. 2, then the stylus 3 may generate an input signal each time the conductive pad 6d, under the designated area of the stencil 4 that is associated with the of the airplane figure, is activated or otherwise energized by the controller 8. The stylus 3 may not generate a triggering input signal when the other conductive pads 6 are activated because such pads are not close enough to the stylus 3. The controller 8 may thus determine, based on the received input signal and the currently activated pad 6d, that the stylus 3 is drawing on the predefined area of the stencil 4 associated with the conductive pad 6d.

Similarly, if the stylus 3 is tracing the upper case "A" of the stencil 4 depicted in FIG. 2, the stylus 3 may generate a triggering input signal only when the conductive pad 6a is energized by the controller 8. As such, the controller 8 may determine that the stylus 3 is tracing the upper case "A" on the stencil 4 as a result of receiving the input signal from the stylus 3 when the controller 8 energizes the conductive pad 6a.

Figure 3:
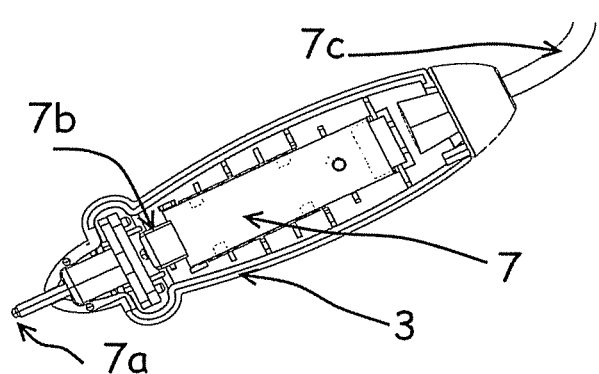
FIG. 3 illustrates various aspects of a stylus of the drawing toy depicted in FIG. 1.

Referring now to FIG. 3, further aspects of the magnetic stylus 3 are shown. In particular, the stylus 3 may include signal processing and/or generation circuit 7, a magnetic tip 7a, a momentary switch 7b linked to the magnetic tip 7a, and a cable 7c that electrically and mechanically couples the stylus 3 to the base unit 1 and controller 8. When the stylus 3 traverses across the drawing panel 2 in sufficient proximity to the drawing panel 2, the magnet tip 7a may induce a visible trace on the drawing panel 2. Furthermore, the momentary switch 7b may detect pressure exerted upon the magnetic tip 7a as a result of the tip traversing across the drawing panel 2.

The controller 8 may detect drawing activity by checking the status of switch 7b. The circuit 7 may amplify the electromagnetic signal induced by the conductive pad 6a-6i under the drawing panel 2. When the stylus 3 is very close to the drawing panel 2, a sensor signal generated by the circuit 7 may exceed a predefined threshold. When the predefined threshold is exceeded, the circuit 7 may generate a triggering input signal that is provided to the controller 8 via the cable 7c.

As depicted in FIG. 1, a transparent stencil 4 may be placed on the drawing panel 2 with its identification tab 10 inserted into or otherwise engaged with the stencil detector 5. The identification tab 10 is depicted in greater detail in FIGS. 2, 4, and 5. The identification tab 10 in one embodiment serves two functions. First, when the identification tab 10 is inserted into the stencil detector 5, the identification tab 10 fixes or positions the stencil 4 with respect to the drawing panel 2 such that designated areas of the stencil 4 align with conductive pads 6 positioned under the drawing panel 2. To facilitate such positioning of the stencil 4, the opening or receiving slot of the stencil detector 5 is dimensioned to engage the identification tab 10 of the stencil 4 and properly position the stencil 4 with respect to the drawing panel 2 when the identification tab 10 is fully inserted into the receiving slot.

Figure 4:
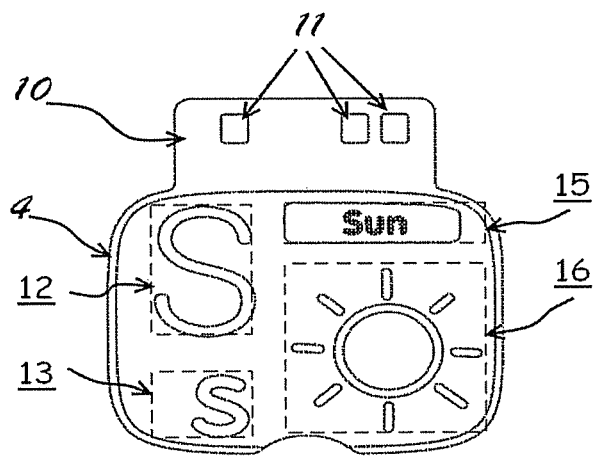
FIGS. 4 and 5 show stencils suitable for use with the drawing toy of FIG. 1.
Figure 5:
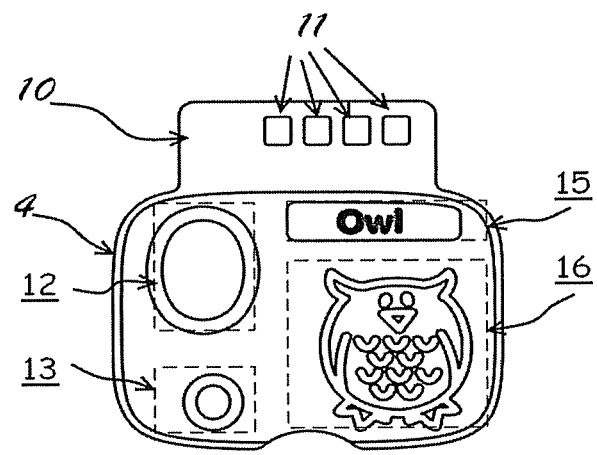

In one embodiment, the identification tab 10 of each stencil card 4 is punched with a unique combination of openings 11 as shown in FIGS. 2, 4, and 5. As depicted in FIG. 2, the stencil detector 5 may include a row of contact switches 9. When identification tab 10 of a stencil 4 is place in the receiving slot, the switches 9 which align with the openings 11 on the identification tab 10 remain open and the other switches 9 are closed by the identification tab 10. Based upon the open and/or closed status of the switches 9, the controller 8 may then identify the stencil 4.

As shown in FIGS. 2, 4, and 5, a stencil 4 may include several designated tracing areas 12, 13, 15, 16 that are shaped similarly to corresponding conductive pads 6a, 6b, 6c, and 6d. Information about the designated areas 12, 13, 15, 16 of each stencil 4 may be stored in memory 8b of the controller 8. See, FIG. 6. In particular, the memory 8b may comprise various types of memory such as random access memory, read only memory, flash memory, etc. The memory 8b may store instructions executed by a processor 8a of the controller 8 during the course of operation. The memory 8b may further store data such as digital audio data used by the processor 8a to provide an appropriate response based on the identified stencil 4 and a tracing area 12, 13, 15, 16 associated with the position of the stylus 3.

Figure 6:
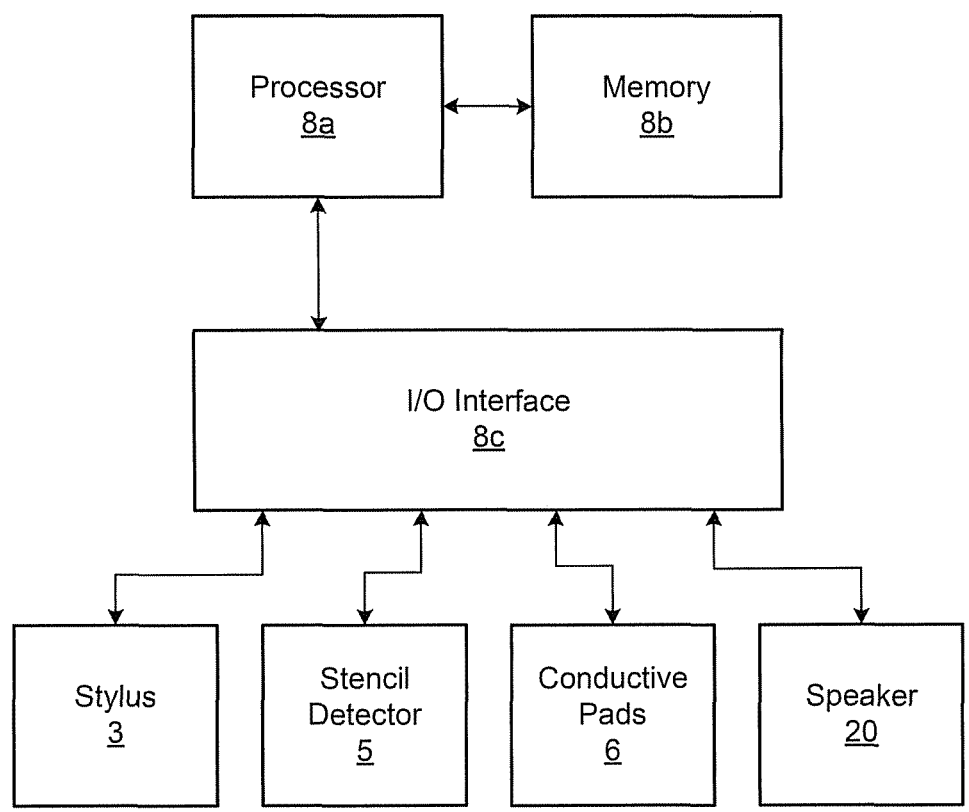
FIG. 6 provides a simplified block diagram of a controller and associated circuitry that may implement various aspects of the drawing toy of FIG. 1.

As shown in FIG. 6, the controller 8 may include the processor 8a, the memory 8b, and an I/O interface 8c. The I/O interface 8c may include one or more input and/or output pins for receiving and/or sending signals to other components of the drawing toy. In particular, the I/O interface 8c may be coupled to a speaker 20 to permit the processor 8a to drive the speaker 20 and generate audio signals. The I/O interface 8c may be further coupled to the conductive pads 6a-6i in order to energize such pads. For example, the I/O interface 8c may include a separate output pin for each conductive pad 6a-6i in order to permit the processor 8a to individually control the activation of the conductive pad 6a-6i. The I/O interface 8c may further be coupled to the stylus 3 and the stencil detector 5 in order to receive respective input signals.

Referring now to FIG. 4, an "S" stencil 4 is shown. The "S" stencil 4 may be placed on the drawing panel 2 with its identification tab 10 in the receiving slot of the stencil detector 5. As a result of such placement, the controller 8 may determine, based on the identification tab 10 and activated switches 9 of the stencil detector 5, that the "S" stencil 4 is placed on the drawing panel 2. Accordingly, based on information stored in the memory 8b, the processor 8a "knows" that the placed stencil is the "S" stencil and that designated area 12 corresponds an upper case "S", the designated area 13 corresponds a lower case "s", the designated area 15 corresponds to the word "Sun", and the designated area 16 corresponds to a depiction of a "Sun." The controller 8 may then interact with the child by causing a the speaker 20 to generate an appropriate audio signal in response to detecting the stylus 3 in each of the respective areas 12, 13, 15, and 16.

In particular, the controller 8 may generate signals that cause the speaker 20 to generate audio signals that tell the child that the inserted stencil is for the letter "S" and provides the child with phonics information about the letter "S" when the child places the "S" stencil 4 on the drawing panel 2. The controller 8 may further encourage the child to trace the upper case "S", the lower case "s", and the SUN figure on the stencil 4.

In response to the child tracing the upper case "S" with the stylus 3, the controller 8 may detect that the stylus is positioned proximate conductive pad 6a which is aligned with designated area 12 of the "S" stencil 4. Based on information in the memory 8b, the processor 8a may obtain and generate an appropriate response for the detected tracing area 12 of the "S" stencil 4. For example, the controller 8 may generate signals that cause the speaker 20 to generate audio signals that tell the child that he is writing an upper case "S".

Similarly, in response to the child tracing the lower case "s" with the stylus 3, the controller 8 may detect that the stylus is positioned proximate conductive pad 6b which is aligned with designated area 13 of the "S" stencil 4. Based on information in the memory 8b, the controller 8 may obtain and generate an appropriate response for the detected designated area 13 of the "S" stencil 4. For example, the controller 8 may generate signals that cause the speaker 20 to generate audio signals that tell the child that he is writing a lower case "s".

Similarly, the controller 8 and speaker 20 may generate audio signals that tell the child that he is drawing the Sun when the stylus 3 is proximate designated area 16 and conductive pad 6d. The controller 8 and speaker 20 may generate audio signals that appreciate the job done by the child in response to detecting the child has completed writing or drawing in a designated area 12, 13, 15, 16. For example, the controller 8 may determine the child has completed a designated area of the stencil 4 in response to detecting the stylus 3 is proximate a different conductive pad 6a-6i. Furthermore, the controller 8 may generate signals that cause the speaker 20 to provide the pronunciation and/or spelling of the word "SUN" in response to detecting the stylus 3 proximate conductive pad 6c and designated region 15 of the "S" stencil 4.

Figure 7:
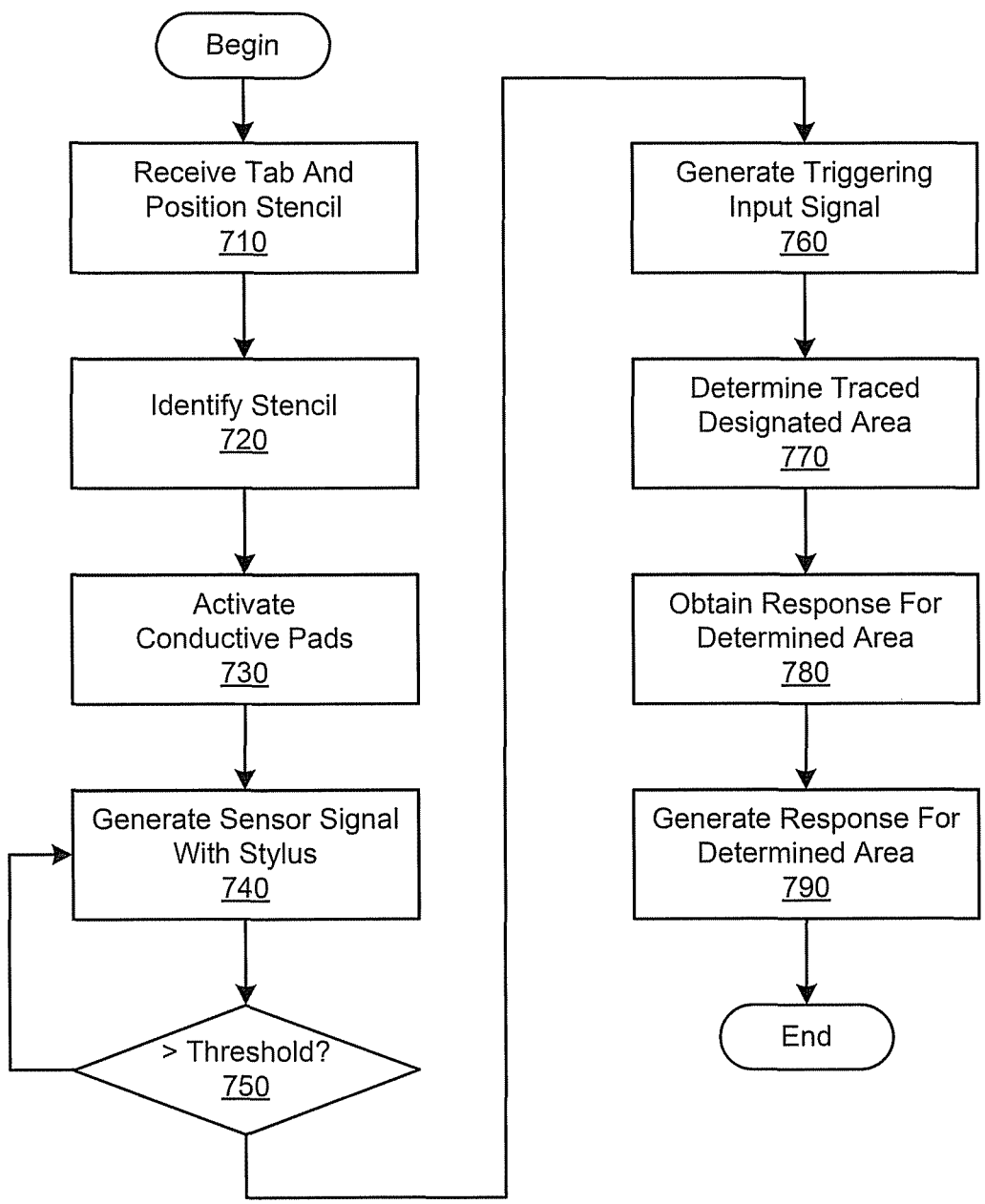
FIG. 7 shows a flowchart depicting aspects of the drawing toy of FIG. 1.

Referring now to FIG. 7, a flowchart of a method that may be implemented by the drawing toy is shown. At 710, the stencil detector 5 may receive an identification tab 10 of a stencil 4 and position the stencil 4 with respect to the drawing panel 2. The controller 8 at 720 may identify the received stencil 4 via switches 9 of the stencil detector 5 activated by the identification tab 10. At 730, the controller 8 may activate conductive pads 6 positioned under the drawing panel 2 one at a time in an attempt to determine which designated area 12, 13, 15, 16 of the stencil 4 the stylus 3 is tracing. At 740, the sensing/generation circuit 7 of the stylus generates a sensor signal having a magnitude dependent on the proximity of the stylus tip 7a to the currently energized pad 6. The circuit 7 at 750 determines whether the sensor signal has a predetermined relationship to a threshold level. If the sensor signal has the predetermined relationship, the sensing/generation circuit 7 at 760 generates a triggering input signal for the controller 8.

At 770, the controller 8 determines which designated area 12, 13, 15, 16 is being traced based on the activated conductive pad 6 and the input signal received from the stylus 3. The controller 8 at 780 obtains an appropriate response for the identified area being traced from the memory 8b. At 790, the controller 8 generates output signals via I/O interface 8b that cause the speaker 20 to generate audio signals appropriate for the designated area being traced.

One skilled in the art would readily appreciate that many modifications and variations of the disclosed embodiments are possible in light of the above teachings. Thus, it is to be understood that, within the scope of the appended claims, aspects of the disclosed embodiments may be practiced in a manner other than as described above.

What is claimed is:

1. A method for generating user perceivable output in response to user input, the method comprising:
   receiving, via a stencil detector of a drawing toy, an identification tab of a stencil placed upon a drawing surface of the drawing toy, wherein the stencil comprises a plurality of designated areas and a plurality of trace paths configured to be traced by a stylus of the drawing toy, and wherein each designated area includes at least one trace path of the plurality of trace paths;
   identifying the stencil based upon information provided on the identification tab of the stencil;
   aligning the plurality of designated areas of the stencil with a plurality of conductive pads positioned under the drawing surface of the drawing toy as a result of said receiving;
   activating, via a controller of the drawing toy, each conductive pad of the plurality of conductive pads one at a time to cause each conductive pad to generate an electromagnetic signal during an activation period for the respective conductive pad, wherein said activating comprises randomly activating the plurality of conductive pads one at a time;
   generating, during the activation period for one of the plurality of conductive pads, an input signal with the stylus based on the electromagnetic signal received from the activated one of the plurality of conductive pads during its respective activation period and proximity of the stylus to the activated one of the plurality of conductive pads;
   in response to receiving the input signal from the stylus, determining, with the controller, that a location of the stylus corresponds to the particular designated area aligned with the activated one of the plurality of conductive pads; and generating an output signal that produces the user perceivable output associated with the particular designated area in response to determining that the location of the stylus corresponds to the particular designated area of the stencil.

2. The method of claim 1 further comprising:

generating a sensor signal via the stylus as the stylus traces a trace path of the stencil, wherein a magnitude of the sensor signal is dependent upon distance between an activated conductive pad and the stylus; and producing the input signal with the stylus in response to determining that the magnitude of the sensor signal has a predetermined relationship to a threshold level.

3. The method of claim 2, further comprising:

actuating a switch in the stylus in response to pressure applied to a tip of the stylus as the stylus traces a trace path of the stencil; and wherein said producing is dependent upon said actuating the switch.

4. The method of claim 1, further comprising driving a speaker based upon the output signal to produce audible feedback associated with the particular designated area.

5. The method of claim 1, further comprising creating a visible trace from magnetic particles of a drawing panel that provides the drawing surface by pulling the magnetic particles toward the drawing surface as a magnetic tip of the stylus moves along the drawing surface.

6. A method for generating user perceivable output in response to user input, the method comprising:

receiving, via a stencil detector of a drawing toy, an identification tab of a stencil placed upon a drawing surface of the drawing toy, wherein the stencil comprises a plurality of designated areas and a plurality of trace paths configured to be traced by a stylus of the drawing toy, and wherein each designated area includes at least one trace path of the plurality of trace paths;

identifying the stencil based upon information provided on the identification tab of the stencil;

aligning the plurality of designated areas of the stencil with a plurality of conductive pads positioned under the drawing surface of the drawing toy as a result of said receiving;

activating, via a controller of the drawing toy, each conductive pad of the plurality of conductive pads one at a time to cause each conductive pad to generate an electromagnetic signal during an activation period for the respective conductive pad, wherein said activating comprises activating the plurality of conductive pads in a pattern;

generating, during the activation period for one of the plurality of conductive pads, an input signal with the stylus based on the electromagnetic signal received from the activated one of the plurality of conductive pads during its respective activation period and proximity of the stylus to the activated one of the plurality of conductive pads;

in response to receiving the input signal from the stylus, determining, with the controller, that a location of the stylus corresponds to the particular designated area aligned with the activated one of the plurality of conductive pads; and generating an output signal that produces the user perceivable output associated with the particular designated area in response to determining that the location of the stylus corresponds to the particular designated area of the stencil.

7. The method of claim 6, further comprising:

generating a sensor signal via the stylus as the stylus traces a trace path of the stencil, wherein a magnitude of the sensor signal is dependent upon distance between an activated conductive pad and the stylus; and producing the input signal with the stylus in response to determining that the magnitude of the sensor signal has a predetermined relationship to a threshold level.

8. The method of claim 7, further comprising:

actuating a switch in the stylus in response to pressure applied to a tip of the stylus as the stylus traces a trace path of the stencil; and wherein said producing is dependent upon said actuating the switch.

9. The method of claim 6, further comprising driving a speaker based upon the output signal to produce audible feedback associated with the particular designated area.

10. The method of claim 6, further comprising creating a visible trace from magnetic particles of a drawing panel that provides the drawing surface by pulling the magnetic particles toward the drawing surface as a magnetic tip of the stylus moves along the drawing surface.

* * * * *